United States Patent [19]

Asada et al.

[11] Patent Number: 5,142,394
[45] Date of Patent: Aug. 25, 1992

[54] TWISTED NEMATIC POLARIZING ELEMENT WITH A CONCENTRIC CIRCLE ORIENTATION SURFACE AND OPTICAL HEAD DEVICE INCORPORATING THE SAME

[75] Inventors: Junichi Asada, Ibaraki; Seiji Nishiwaki, Katano; Shinji Uchida, Osaka, Japan

[73] Assignee: Matsushita Electric Industrial Co., Ltd., Osaka, Japan

[21] Appl. No.: 582,418

[22] Filed: Sep. 14, 1990

[30] Foreign Application Priority Data

Sep. 22, 1989 [JP] Japan .................. 1-246808

[51] Int. Cl.⁵ .............. G02F 1/13; G02F 1/1337; G02B 6/34
[52] U.S. Cl. ............................... 359/75; 359/37; 385/37
[58] Field of Search ............. 350/339 R, 340, 341; 359/37, 75, 73, 76

[56] References Cited

U.S. PATENT DOCUMENTS 4,991,919 2/1991 Nishiwaki et al. ................ 385/14

FOREIGN PATENT DOCUMENTS

0394461 10/1990 European Pat. Off. .
2816851 10/1979 Fed. Rep. of Germany ...... 350/336
0047021 4/1981 Japan .................. 350/336
0306420 12/1988 Japan .................. 350/336
1-205123 8/1989 Japan .
8906424 7/1989 World Int. Prop. O. .
9001768 2/1990 World Int. Prop. O. .

Primary Examiner—Stanley D. Miller
Assistant Examiner—Anita Pellman Gross
Attorney, Agent, or Firm—Stevens, Davis, Miller & Mosher

[57] ABSTRACT

An optical head device has a light source for emitting a light, a polarizing element for converting the linearly polarized emitted light into a concentric-circle polarized light or a radially polarized light, a concentric grating coupler through which the polarized light is introduced into a waveguide layer, and another polarizing element for converting the light radiated from the waveguide layer into a linearly polarized light. The light is applied to and reflected by the surface of an optical disk and introduced into the waveguide layer again as a concentric-circle polarized light or radially polarized light due to reversability of light, whereby the reflected light is detected. Each of the polarizing elements has a twist nematic liquid crystal layer having a linearly oriented liquid crystal orientation surface and a concentric-circle oriented liquid crystal orientation surface.

16 Claims, 9 Drawing Sheets

TWISTED NEMATIC POLARIZING ELEMENT WITH A CONCENTRIC CIRCLE ORIENTATION SURFACE AND OPTICAL HEAD DEVICE INCORPORATING THE SAME

BACKGROUND OF THE INVENTION

Field of The Invention

The present invention relates to a polarizing element for converting a state of polarizing of light, and also to an optical head device incorporating the polarizing element.

Hitherto, a linear retarder such as a ½ wavelength plate or a ¼ wavelength plate has been used as a polarizing element for converting the state of polarization of light in the optical system of a device such as an optical head device. This type of element is adapted to convert the polarization state over its entire area. Display devices also are known such as a liquid crystal display device using twist nematic liquid crystal (referred to as "TN" liquid crystal"). In this type of display device, the state of arrangement of the liquid crystal molecules is varied so as to convert the state of polarization on pixel basis. There is a practical limit in the refining of the pixels. At the present stage, the minimum possible pixel size of 100 to 200 μm square is available. In the field of optical integrated element having light waveguide and grating, there is an increasing demand for a technology which enables, within a small area, conversion from a polarization state having a spatially non-uniform distribution to a uniform polarization state such as linear polarization state, and vice versa.

In particular, in case of an optical integrated element which emits light to the exterior of a wave-guide path by means of a concentric-circle-type grating coupler, it is necessary to conduct a polarization conversion between light having an oscillation plane in a direction tangential to the concentric circle or in a direction of dynamic radius of the circle (that is, light in an inhomogeneous state) and light in a homogeneous state (that is, linear polarized light). Unfortunately, however, there was no element which would conduct such a conversion. The present applicant, therefore, proposed a polarization element having such a conversion function, as well as an optical head device incorporating such a function, in a PCT application No. JP89-00797. These are referred to as "prior art", hereinafter.

The polarizing element and an optical head device of the prior art will be described with reference to FIGS. 1 to 3B.

Figure 1:
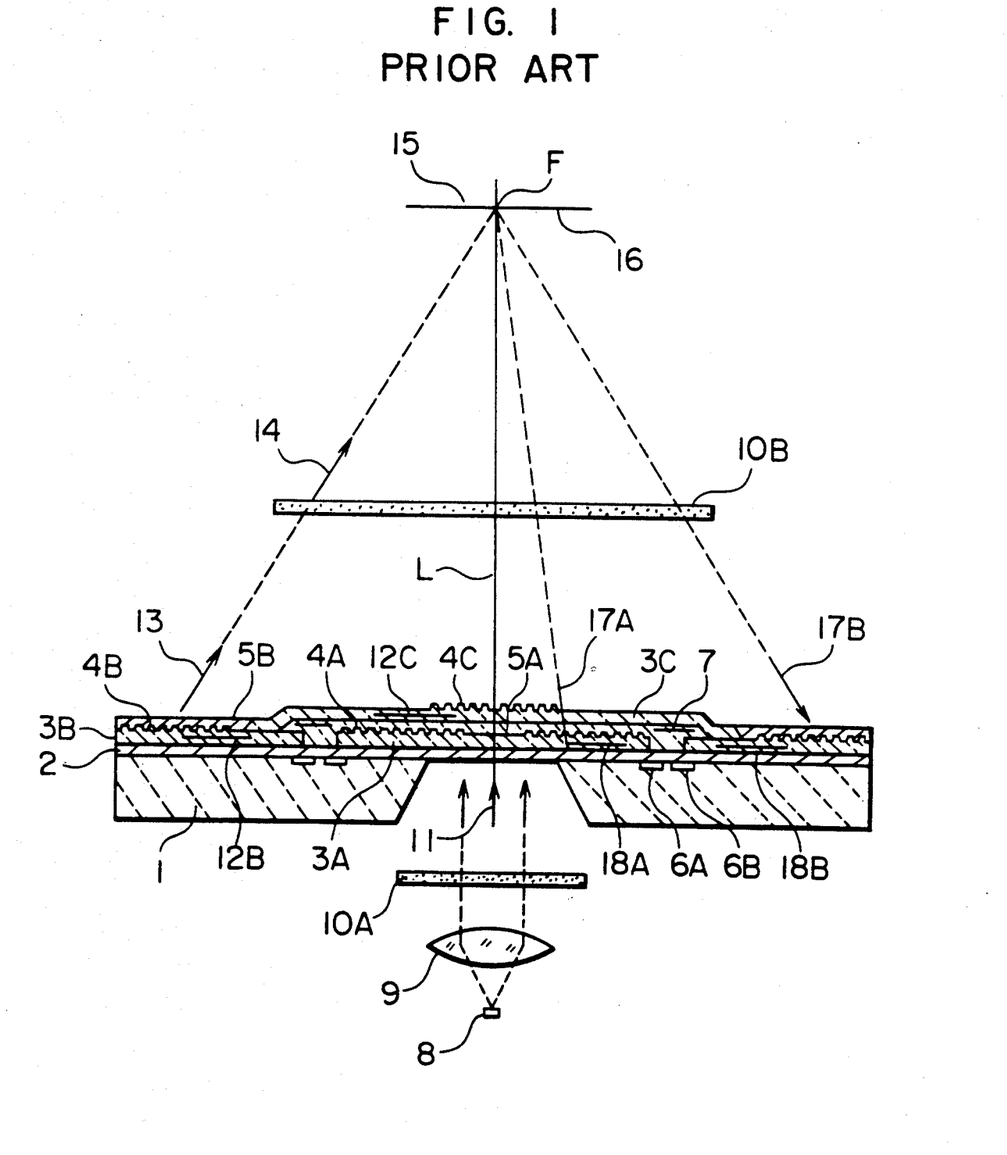
FIG. 1 is a side elevational view of a critical portion of an optical head of a prior art proposed in PCT application No. JP89-00797 by the same applicant.

FIG. 1 is an illustration showing the construction of an optical head device of the prior art. Referring to these figures, a transparent layer 2 of a small refractive index is formed on an Si substrate 1. Transparent layers 3A and 3B of a greater refractive index are formed on the transparent layer 2. The transparent layer 3A has a circular form while the transparent layer 3B has an annular form surrounding the layer 3A. These transparent layers 3A and 3B are insulated from each other. Grating couplers 4A and 4B in the forms of circles concentric with respect to the central axis L are formed on the transparent layers 3A and 3B. A transparent layer 3C of a large refractive index is formed on the surface of the transparent layer 3A with a transparent layer 5A of a small refractive index being sandwiched therebetween. The transparent layer 3C contacts with the transparent layer 3B at a region facing the inner periphery of the grating coupler 4B on the transparent layer 3B. A grating coupler 4C concentric with respect to the central axis L is formed on the surface of the transparent layer 3C. A transparent layer 5B of a small refractive index is formed on the surface of the transparent layer 3B so as to cover the region where the grating coupler 4B exists. The refractice index of the transparent layer 5B is equal to that of the transparent layer 5A. Photo-detectors 6A and 6B are formed on the region which forms the insulation between the transparent layers 3A and 3B on the Si substrate 1. A refractive film 7 is formed in the transparent layer 5A so as to cover the detectors 6A and 6B. The portion of the Si substrate 1 near the central axis L is made hollow by, for example, etching.

The light emitted from a semiconductor laser 8 and linearly polarized is condensed by a condenser lens 9 and is converted by a polarizing element 10A into a light 11 having an electric field vector of a direction tangential or radial to the concentric circles. The light 11 is inputted to the waveguide layer 3C by the concentric grating 4C, so as to become a wave-guided light 12C of a TE (or TM) mode which propagates radially outwardly through the layer 3C. At the outer peripheral region of the waveguide layer 3C, the light 12C is transmitted to the waveguide layer 3B so as to become a wave-guide light 12B. The wave-guided light 12B is then changed into a radiation light 13 through the grating coupler 4B. If the wave-guide light 12B is of the TE mode, the radiation light 13 has such a polarization state that the electric field vector is tangential to the concentric circle (this state will be referred to as "concentric circle polarization"), whereas, if the wave-guided light 12B is of the TM mode, the radiation light is of a polarization state in which the electric field vector is directed in the direction of radius of the concentric circles (this polarization state will be referred to as "radial polarization"). Thus, the light 13 is converged at a point F on the reflective surface 16 of the optical disk 15. The light reflected from the reflective surface 16 is inputted into the waveguide layers 3A, 3B through the grating couplers 4A and 4B so as to become, respectively, wave-guided lights 18A and 18B of TE (or TM) mode propagating radially outwardly and inwardly through the respective layers 3A and 3B. The wave-guided lights 18A and 18B are radiated at the radially outer and inner ends of the waveguide layers 3A and 3B, and are received by the photo-detectors 6A and 6B.

In this prior art arrangement, in order to attain a large convergence of light, a polarizing element 10B, which is capable of performing a reversible conversion between linear and concentric circle (or radial) polarization states, is disposed between the point of convergence F and the grating coupler 4B. A polarizing element 10A, capable of performing a reversible conversion between the linear and concentric circle polarization states is disposed between the semiconductor laser 8 and the grating coupler 4C, in order to attain a higher degree of input coupling efficiency through the grating coupler 4C.

Figure 2A:
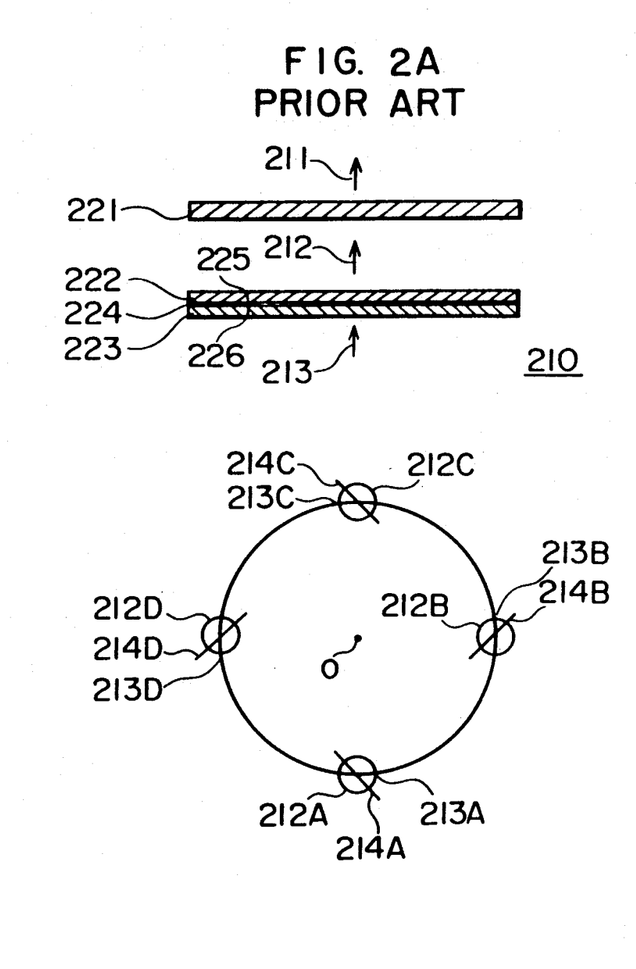
FIGS. 2A and 2B are illustrations of polarizing elements of the prior art proposed by the same applicant.
Figure 2B:
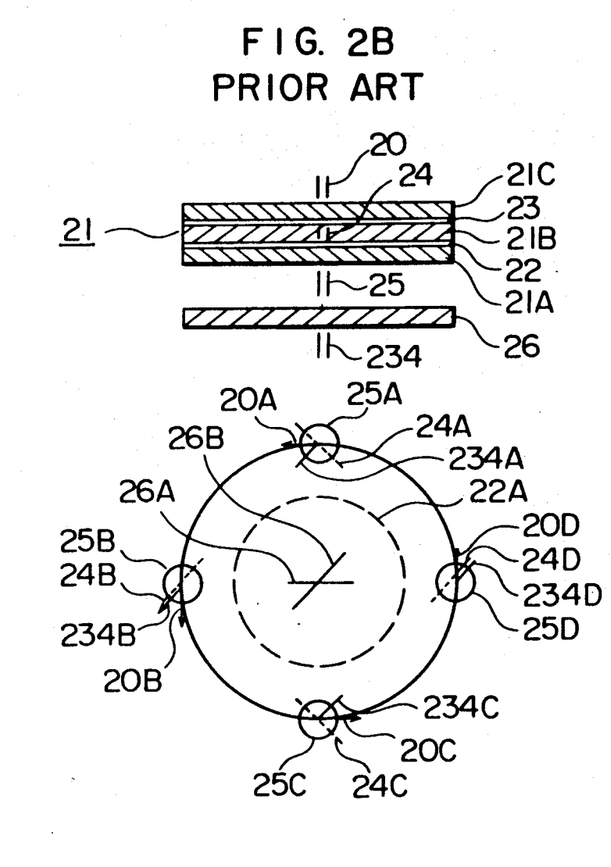

A description will now be made of the constructions of the polarizing elements 10A, 10B in the prior art, as well as the principle of conversion between the concentric circle polarization state and the linear polarization state, with specific reference to FIGS. 2a and 2b. FIG. 2a shows a first embodiment described in the specification of the aforementioned PCT application disclosing the prior art. A polarizing element 210 is composed of a ¼ wavelength plate 221 and a homogeneous liquid crystal layer 224. The surfaces 225, 226 of transparent substrates 222, 223 have been subjected to a liquid crystal orientation treatment in the directions 214A, 214B, 214C and 214D which are inclined at 45° to the directions tangential to the concentric circles. A tangential light 213 (in polarization directions 213A, 213B, 213C, 213D) is a light having polarization directions which form 45° to the directions 214 (214A, 214B, 214C, 214D) of the optical axes (directions of liquid crystal orientation) of a homogeneous liquid crystal layer 224. This light 213, as it passes through the homogeneous liquid crystal layer 224 having an optimum thickness, is changed into light 212 of a circular polarization having polarization directions 212A, 212B, 212C, 212D). The light is then changed to a linearly polarized light 211 as it passes through the ¼ wavelength plate 221. FIG. 2b shows another embodiment of the prior art shown in the above-mentioned PCT application. Referring to this Figure, the polarizing element 21 is composed of a ¼ wavelength plate and two liquid crystal layers: namely, a TN type liquid crystal layer and a homogeneous liquid crystal layer. The homogeneous liquid crystal layer 22 is interposed between transparent substrates 21A and 21B, while the TN liquid crystal layer 23 is interposed between the transparent substrate 21B and a transparent substrate 21C. The homogeneous liquid crystal layer 22 is oriented concentrically or radially on the surfaces of the transparent substrates 21A, 21B, so that its optical axis is tangential or radial as denoted by 22A. On the other hand, the TN liquid crystal layer 23 has been orientation-treated such that the orientation is tangential at one of the orientation surfaces and 45° to the tangent at the other orientation surface. Therefore, the polarization direction turns 45° in the clockwise direction for example, as the light passes through this liquid crystal layer 23. Consequently, a light 20 of concentrical circle polarization (polarizing directions 20A, 20B, 20C, 20D) is changed into a light 24 of polarization (polarizing direction 24A, 24B, 24C, 24D). In addition, the homogeneous liquid crystal layer 22 adds a phase difference of ¼ wavelength, whereby a circularly polarized light 25 is obtained. This circularly polarized light 25 is then changed to a linearly polarized light 26B as it passes through a ¼ wavelength plate 26 the optical axis of which extends in the direction 26A. Conversely, a linearly polarized light, when passed through a ¼ wavelength plate 26 and this polarizing element 21, is converted to a concentric circle polarizing light or radially polarized light due to reversability of the light. This polarizing element can produce a phase delay, i.e., aberration, in the light passing through the liquid crystal layer. In the prior art, thickness of the transparent substrates 222, 223 or 21A, 21B, 21C are suitably modulated depending upon positions thereon to cancel this aberration, thereby attaining a complete polarization without aberration.

A description will now be given of effects produced by the polarization element 10B which is interposed between the grating 4B and the point of convergence F as shown in FIG. 1.

Figure 3A:
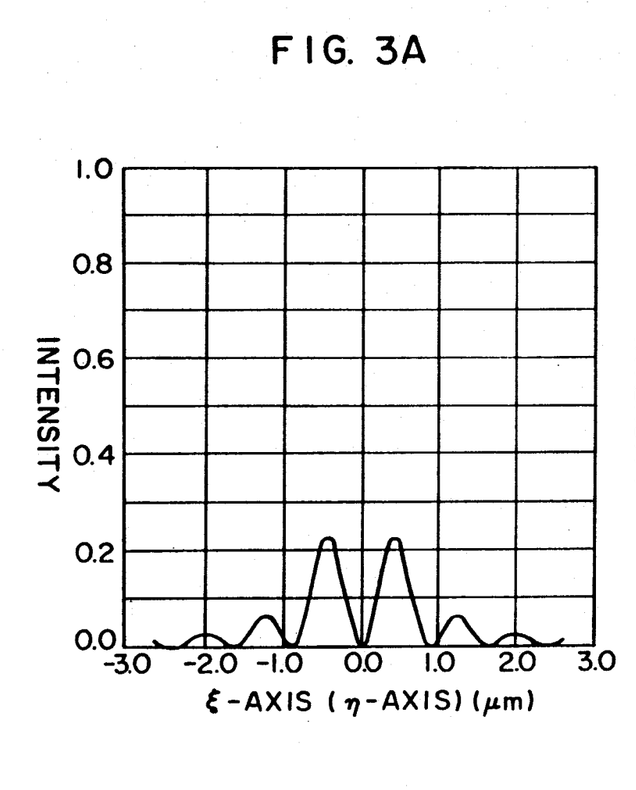
FIGS. 3A and 3B are illustrations of light intensity distribution at a point of convergence of a concentric-circle polarized light and a linearly polarized light, respectively.
Figure 3B:
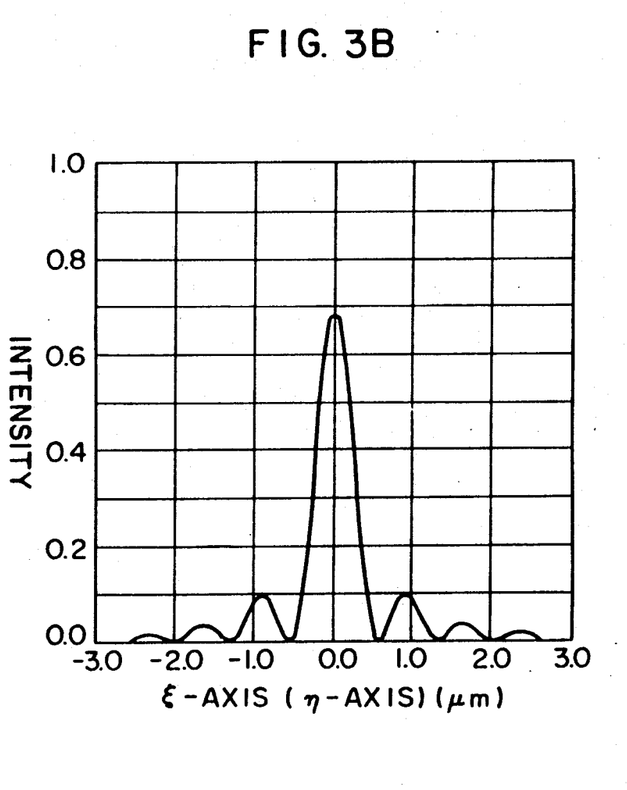

FIGS. 3A and 3B show examples of light-intensity distribution cross-sections at the point of convergence on which a concentric circle-polarized (or radially polarized) light and a linearly polarized light, respectively, are converged through a concentric circular grating coupler. As will be understood from a comparison between FIGS. 3a and 3b, the concentric-circle polarized light (or radially polarized light) exhibits an inferior converging characteristic as compared with the linearly polarized light. This is because, in the former case, the electric field components at diagonally opposing portions of the concentric circle for vectors are reverse to each other so as to cancel each other at the point of convergence F. The polarization element 10b disposed between the grating coupler 4B and the point of convergence F offers a good converging characteristic as it converts the concentric-circle polarized light (or radially polarized light) into a linearly polarized light.

On the other hand, the input coupling efficiency of the grating couplers 4A, 4B for introducing the reflected light 17 into the wavegudie paths 3A, 3B is related to the state of polarization of the reflected light. In order to attain a high coupling efficiency, it is desirable that the reflected light has the same state of polarization as the radiation light. Thus, the polarization element 10B, which conducts a reversible polarization between linearly polarized light and concentric-circle (or radial) polarized light can also produce an effect to improve the efficiency of coupling of the reflected light to the wave-guided light.

The polarization element 210 or 21 shown in FIGS. 2a and 2b of the prior art, however, suffers from the following disadvantages. When a circularly polarized light passes through the homogeneous liquid crystal layer 224 or 22, the phase of the light is offset by an amount Φ at the position of the deflection angle Φ. It is therefore necessary to cancel this phase delay (aberration) by, for example, modulating the thickness of the transparent plate, which require greater number of parts and process steps. In addition, the construction of this polarization element is complicated as it is composed of a ¼ wavelength plate and one or two liquid crystal layers. This makes it difficult to design and construct a compact element. Furthermore, liquid crystal orientation in directions 45° to the lines tangential to the concentric circles cannot be attained by a simple orientation treatment such as rubbing.

SUMMARY OF THE INVENTION

The first aspect of the present invention is devised in view of the above-mentioned problems inherent to the prior art arrangement, and accordingly, in view of the first aspect of the present invention, one object of the present invention is to provide a light polarizing element which can have a simple structure and which can easily be manufactured at a low cost.

Further, another object of the present invention is to provide a light polarizing element having one TN liquid crystal layer whose molecular orientation surface can be formed simply by rubbing. That is, no complicated rubbing process is required.

According to the second aspect of the present invention, it is also an object of the present invention to provide an optical head device in which the above-mentioned light polarizing element is used and which is therefore simple enough to be produced easily at a low cost.

Accordingly, the polarizing element is constituted by a TN liquid crystal layer in which one of the liquid crystal orientation surfaces has one linear direction while the other liquid crystal orientation surface has an orientation direction tangential to the concentric circle. In addition, the anisotropy Δn of the TN liquid crystal layer, thickness d of the liquid crystal layer and the wavelength λ are determined to meet the following conditions.

$$(4k^2-1)^{-1} \leq \Delta nd/\lambda \leq 2k \quad (k: \text{natural number}) \quad (1)$$

The TN liquid crystal layer may be divided into two regions by a border which passes through the center of the concentric orientation and which is substantially parallel to the linear orientation direction, with phases of lights passing through two regions being offset by π from each other, thus forming a phase compensation means.

Preferably, the above-mentioned phase compensation means includes a transparent plate provided in one of the above-mentioned two regions, the refractive index n and thickness t of the transparent plate satisfying the following condition in relation to the wavelength λ of the light.

$$(n-1)t = (2k-1)\lambda/2 \quad (k: \text{natural number}) \quad (2)$$

According to another aspect of the invention, there is provided an optical head device of the type in which the laser light from a laser source is introduced into the waveguide layer so as to become a wave-guided light which is guided radially from a point 0 in the waveguide layer and radiated by a periodic structure in the form of concentric circle provided in the waveguide layer, so as to be converged on a point outside the waveguide path, characterized in that the above-mentioned polarizing element, with or without the above-mentioned phase compensation means, is provided between the point of convergence and the periodic structure.

Alternatively, a transparent layer of a refractive index smaller than that of the waveguide layer of the optical head is disposed adjacent the waveguide layer, and the phase compensation means is constructed by arranging such that the different lengths of contact between the waveguide layer and the adjacent transparent layer are obtained in two regions separated by a straight line which passes through the center of the concentric circles and which is substantially parallel to the direction of linear orientation, thereby creating a phase difference π between the lights radiated from these two regions.

According to a further aspect of the invention, there is provided an optical head device having coupling means through which a laser light from a laser source is inputted to a waveguide layer so as to become a wave-guided light, a waveguide path through which the wave-guided light is radiated from a point 0 in the waveguide layer, and a periodic structure provided within the waveguide path in the form of concentric circles centered at the point 0, so that the wave-guided light is converged to a point outside the waveguide path, characterized by comprising two polarizing elements of the type mentioned above, one between the point of convergence and the periodic structure and one between the laser source and the coupling means, the polarizing elements having linear orientation directions parallel to each other and parallel to or perpendicular to the electric vibration plane of the laser light.

An embodiment of the polarizing element of the present invention and an embodiment of an optical head device of the invention incorporating the element will be described with reference to FIGS. 4 to 8B.

Figure 4:
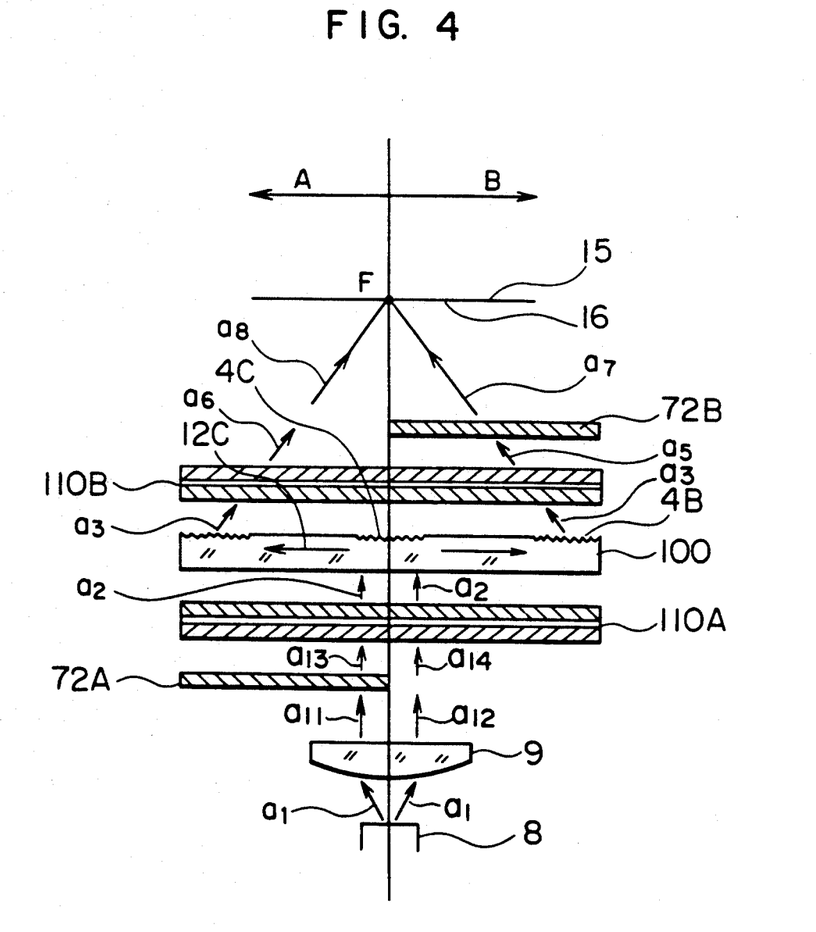
FIG. 4 is a sectional side elevational view of an embodiment of the optical head device of the present invention.

Referring to FIG. 4 schematically showing the optical head device, a waveguide layer 100 composed of a circular transparent layer is provided at its center with a grating coupler 4C in the form of a concentric circle. A doughnut-shaped concentric grating coupler 4B is formed around the grating coupler 4C. Numerals 110A and 110B denote polarizing elements, while 72A and 72B denote transparent plates. These polarizing elements and phase plates will be described later. The optical head device further has a semiconductor laser 8, a condenser lens 9, and an optical disk 15 having a reflective surface 16.

Figure 5A:
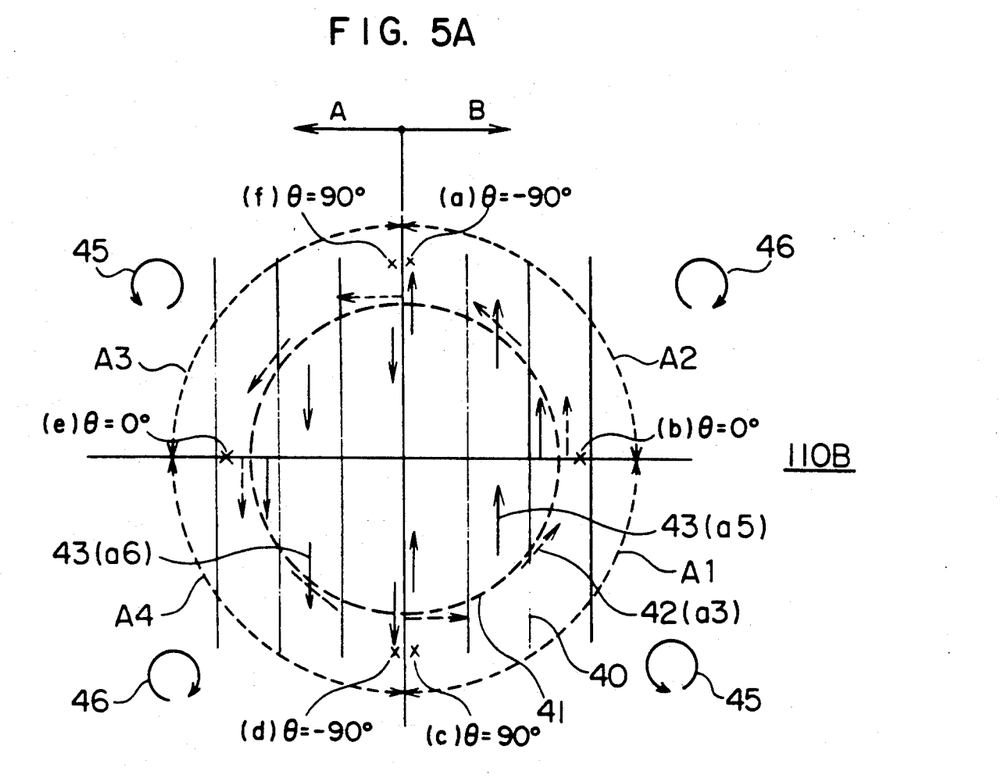
FIGS. 5A and 5B are illustrations of priciple of polarization conversion performed in the optical head device shown in FIG. 4.
Figure 5B:
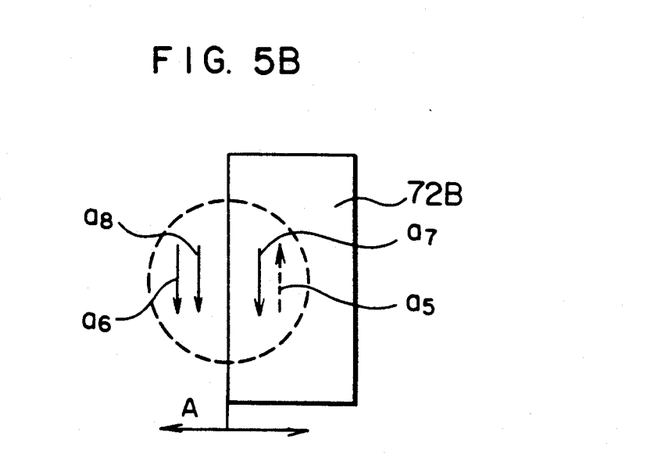

FIGS. 5A and 5B illustrate a change in the state of polarization of a light effected by the polarizing element 110B and the transparent plate 72B. In particular, FIG. 5a shows the principle of polarization conversion performed by the polarizing element 110B. The polarizing element 110B is constituted by a single layer of TN liquid crystal. The TN liquid crystal layer has two crystal orientation surfaces; namely, one surface adjacent to the point of convergence in which liquid crystal is oriented linearly in the direction indicated by a solid line 40 and the other surface adjacent the grating coupler 4B in which the liquid crystal is oriented in directions tangential to a circle indicated by a broken line 41. By effecting this simple liquid crystal orientation treatment, it is possible to obtain a TN liquid crystal layer having a distribution in which the liquid crystal twist angle θ progressively varies along the circumference of the concentric circle. More specifically, in the portion of the illustrated concentric circle starting from (a) and ending at (c) via (b), the twist angle θ progressively and continuously varies from θ=−90° to θ=90° via θ=0°. (Clockwise twist as viewed in the drawing sheet is determined as right twist and the angle of this twist is provided with a minus (−) sign). A similar TN structure is obtained also for the portion of the circle starting at (d) and terminating at (f) via (e).

In general, when a linearly polarized light impinges upon a liquid crystal layer of TN structure, the electric field vector of the light rotates along the twist of the TN structure. Consequently, the concentric-circle polarized light (electric field vector 42 indicated by broken line) radiated from the grating coupler 4B rotates substantially by the same angle as the twist angle of liquid crystal at each position of the element, so as to become a light having electric field vector in the direction of linear orientation of the liquid crystal layer (electric field vector 43 indicated by a solid-line arrow). The liquid crystal layer is divided into two regions A and B by a straight line passing through the center of the concentric circle and parallel to the direction of linear orientation. The liquid crystal layer is twisted in opposite directions in these regions A and B: namely, a phase difference $\pi$ is created.

FIG. 5B shows the principle of the phase compensation performed by the transparent plate 72B of this embodiment. The liquid crystal layer is divided into two regions A and B by a straight line which passes through the center of the concentric circle and substantially parallel to the direction of linear orientation of the liquid crystal layer, and the transparent plate 72B is provided on one of these two regions. Representing the refractive index of the transparent plate 72B by $n_1$, thickness of the transparent plate 72B by t and the wavelength of the laser light by $\lambda$, since the phase difference between the light transmitted through the phase different plate 72B and the light which does not pass through this plate is given by $2\pi(n_1-1) t/\lambda$, it is possible to obtain the transparent $\pi$ between the lights passing through the regions A and B, when the phase difference plate 72B is constructed to meet the following conditions.

$$t = (2k-1) \lambda/2 \ (n_1-1) \ (k: \text{natural number}) \quad (3)$$

Consequently, a matching of phase is obtained between the lights transmitted through the liquid crystal layer having opposite electric field vectors $a_5$ and $a_6$, one of which passes through the phase difference plate 72B, whereby lights of electric field vectors $a_7$, $a_8$ of the same direction are obtained, i.e., a complete linearly polarized light is formed. It is thus possible to convert a concentric-circle polarized light into a linearly polarized light, by using a combination of the polarizing element 110B and the transparent plate 72B.

The transparent plate 72A and the polarizing element 110A have constructions which are the same as those of the transparent plate 72B and the polarizing element 110B described above. That is, the polarizing plate 110A is composed of a single TN liquid crystal layer, with a linear liquid crystal orientation at its surface adjacent to the semiconductor laser 8 and a tangential liquid crystal orientation at its surface adjacent to the waveguide layer 100, thereby converting the linearly polarized light from the semiconductor laser 8 into a complete concentric-circle polarized light. A transparent plate 72A is provided in one of two regions which are separated from each other by a straight line passing through the center of the concentric circle and substantially parallel to the direction of linear orientation of the polarizing element 110A. The direction of linear orientation of the polarizing element 110A is disposed in parallel with or perpendicularly to the vibration plane of the laser beam, with the linearly oriented surface thereof facing the laser light source.

Explanation will be hereinbelow made of changes in polarization and phase of light passing through the optical head device shown in FIG. 4, successively in the order. Laser light $a_1$ of linear polarization emitted from a semiconductor laser 8 is converged by the condenser lens 9, and therefore is turned into parallel ray light.

The parallel ray light from the condenser lens 9 is considered in two parts, that is, light $a_{11}$ which is transmitted through the region A and light $a_{12}$ which is transmitted through the region B in order to make the explanation more clear. The light $a_{11}$ is transmitted to the polarizing element 110A by way of the transparent plate 72A while the light $a_{12}$ is transmitted directly to the polarizing element 110A, that is, they are turned into lights $a_{13}$, $a_{14}$. Due to the presence of the transparent plate 72A, the phase of the light $a_{13}$ is shifted from that of the light $a_{14}$ by $\pi$ if the refraction index and thickness of the transparent plate 72A, and the wavelength of the lights satisfy the relationship given by the equation (3). However, these lights $a_{13}$, $a_{14}$ still have linear polarization. After the lights $a_{13}$, $a_{14}$ passing through the polarizing element 110A, they are turned into lights of concentric polarization having an oscillating plane in a direction tangential to concentric circles. As already explained with reference to FIG. 5a, a phase difference occurs between the lights on the region A and the region B by $\pi$ after passing through the polarizing element 110A, and accordingly, the phase difference $\pi$ between the lights $a_{11}$, $a_{12}$ is canceled when they pass through the polarizing element. As a result, they are turned into light $a_2$ of complete concentric polarization. This light $a_2$ is introduced into a waveguide layer 100 through the intermediary of the grating coupler 4C, and is then turned into guided light 12C which is transmitted through the waveguide layer 100 radially from the inner periphery to the outer periphery of the latter, and which is then emitted as radiation light $a_3$ by the grating coupler 4B. This radiation light $a_3$ is of concentric polarization, and is then turned into lights $a_6$, $a_5$ of linear polarization in the regions A, B, respectively, after passing through the polarizing element 110B, having a phase difference $\pi$ therebetween. However, the light $a_5$ alone in the region B is transmitted through the transparent 72B, and accordingly the phase difference $\pi$ between the lights $a_6$, $a_5$ is compensated. Thus, lights $a_7$, $a_8$ of complete linear polarization, having equal phases can be obtained on the regions A, B, respectively, and are then focused to the point F on the reflecting surface 16 of the optic disc 15.

The light reflected from the reflecting surface 16 is turned into light of concentric polarization after passing through the transparent plate 72B and the polarizing element 110B and is introduced into the waveguide layer 100 through the grating coupler 4B, which is then detected by a photodetector that is arranged similar to the one shown in FIG. 1. It is to be noted that the efficiency of input of the light introduced into the waveguide layer 1 by the grating coupler 4B is high since the light of linear polarization which is reflected from the reflecting surface 16 is turned into the light of concentric polarization by virtue of the reversibility of light.

It is to be noted that the rubbing of the molecular orientation surface of the liquid crystal can be easily made if the molecular orientation is set to be tangential to a circle since the rubbing is simply made by pressing the molecular orientation surface of the liquid crystal against a rubbing disk which is being rotated.

Figure 6A:
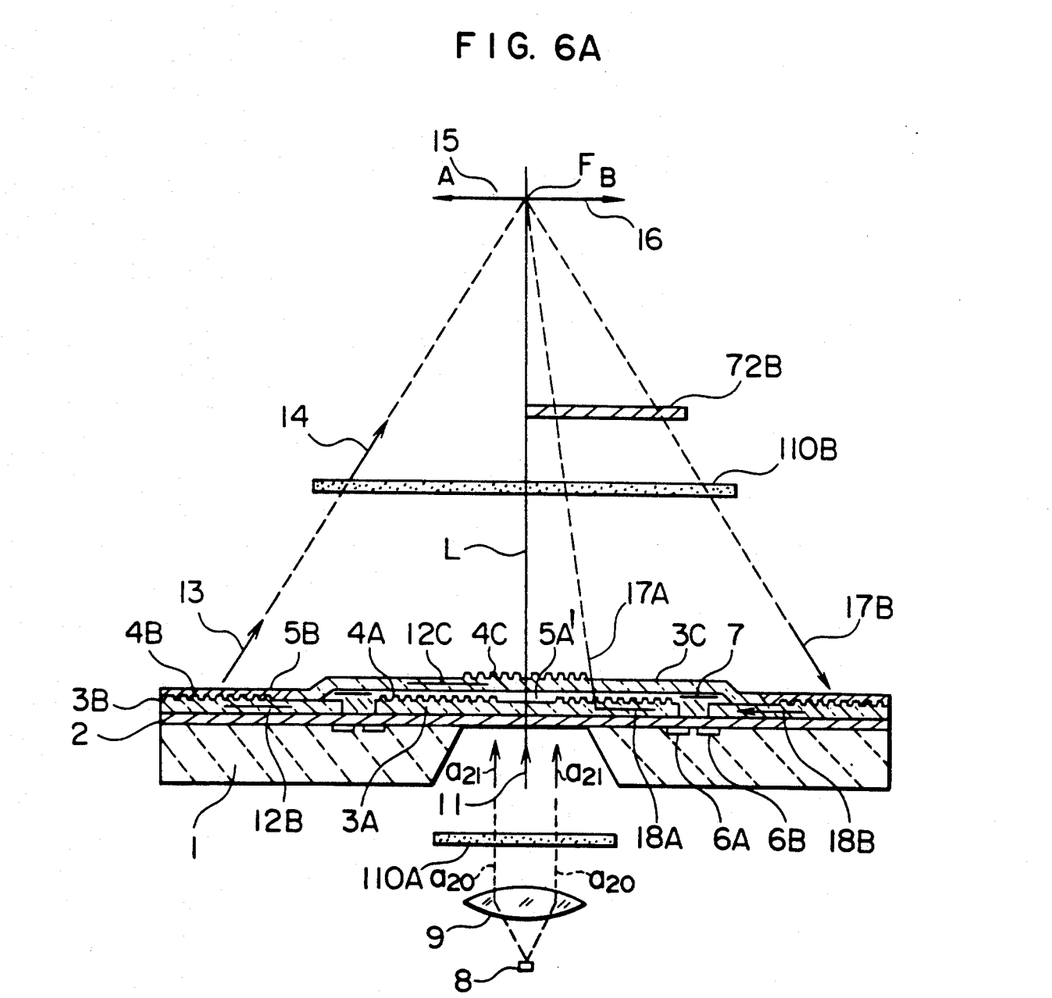
FIGS. 6A and 6B are illustrations of appearances of another example of means for effecting phase matching of light in the optical head device of the present invention.
Figure 6B:
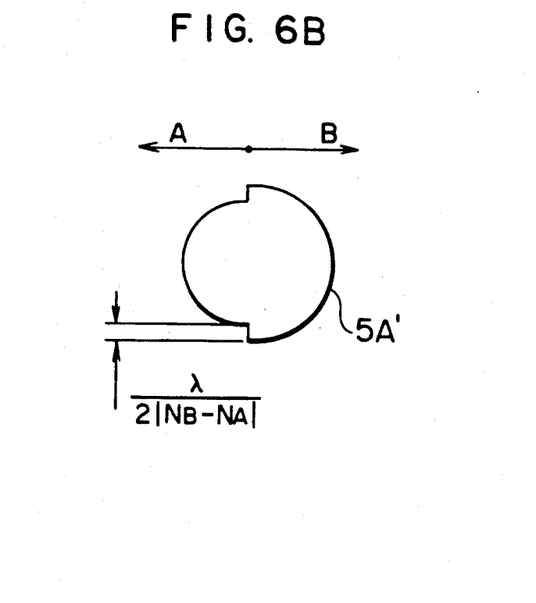

FIG. 6A is a sectional view of a critical portion of another embodiment of the optical head device in accordance with the present invention. The arrangement in this embodiment is different from that shown in FIG. 1 in that the polarizing elements 10A and 10B are substituted by the polarizing elements 110A, 110B of FIG. 4. In addition, this embodiment has a different construction of the transparent layer 5A' and is provided with a transparent plate 72B which is not used in the arrangement shown in FIG. 1. The transparent layer 5A' is disposed adjacent to the waveguide layer 3C. Different lengths of contact between the waveguide layer 3C and the transparent layer 5A', as measured in the radial direction around the center of the concentric circle, are obtained in two regions which are separated from each other by a line passing through the center of the concentric circle and extending substantially in parallel with the direction of linear polarization. Namely, a step of a height represented by $\lambda/2|N_B-N_C|$, where $N_B$ and $N_C$ respectively represent the effective indices of the wave-guided lights 12B and 12C, is formed so that these two regions create a phase difference $\pi$ in the waveguided light passing through these two regions.

Referring to FIG. 6a, the light of linear polarization from the semiconductor laser 8 is turned into light of concentric polarization, having a phase difference $\pi$ between the region A and the region B after passing through the polarizing element 110A, and accordingly, radiation light 13 from the grating coupler 4B is of concentric polarization, having equal phases.

Explanation will be hereinbelow made of operation of this embodiment.

Figure 6C:
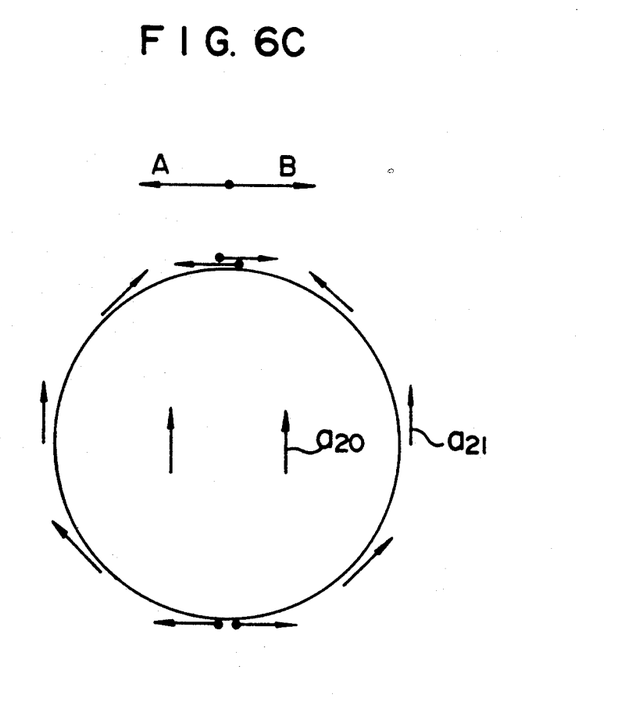
FIG. 6C is a view explaining the polarization of light.
Figure 7:
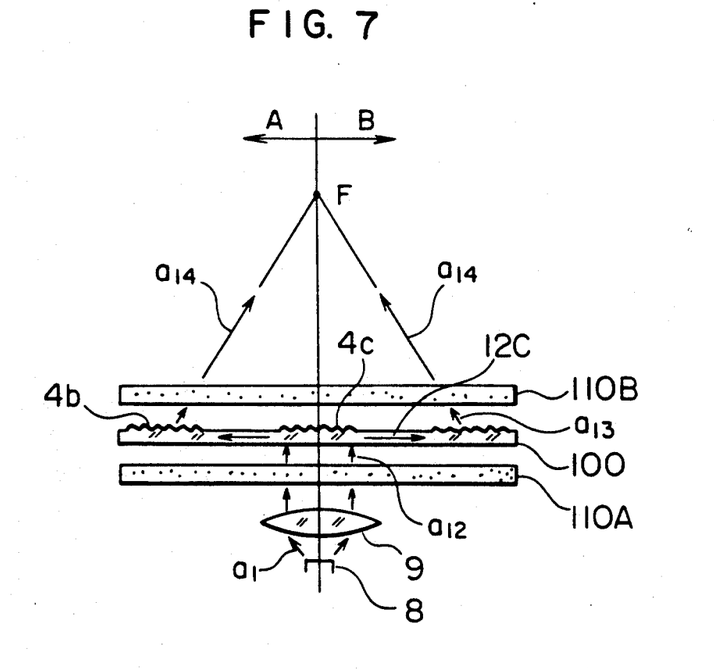
FIG. 7 is a sectional side elevational view of another embodiment of the optical head device of the present invention.

Referring to FIG. 6a, the light of linear polarization from the semiconductor laser 8 is turned, by the condenser lens 9, into parallel ray light $a_{20}$ which is then turned into light $a_{21}$ of concentric polarization after passing through the above-mentioned polarizing element 110A. This light $a_{21}$ of concentric polarization has field-vectors which are in the same direction at diagonal positions on concentric circles as shown in FIG. 6c since the phase of the light $a_{20}$ of linear polarization incident upon the polarizing element 110A is completely uniform. It is noted that the field vectors of the light $a_{21}$ of concentric polarization are in directions tangent to the concentric circles, and accordingly, the efficiency of input of light introduced into the waveguide layer by the grating coupler is high. The light $a_{21}$ of concentric polarization is introduced into the waveguide layer 3C through the intermediary of the grating coupler 4C, and is turned into guided light 12C. At this stage, since the difference in radial length of contact, from the center of the concentric circles, between the waveguide layer 3C and the transparent layer 5A' occurs between the regions A, B, the guided light in the region A and the guided light in the region B have a phase difference $\pi$. Accordingly, the radiation light 13 from the grating coupler 4B have concentric polarization in which the field vectors of the light at diagonal positions on the concentric circles are in directions reverse to each other, that is, the radiation light is of complete concentric polarization. This light 13 of concentric polarization is turned into light of linear polarization having equal phases after passing through the polarizing element 110B and the transparent plate 72B. It is noted that in this embodiment, either the transparent plate 72A or the transparent plate 72B can be eliminated from the arrangement shown in FIG. 4.

Description will now be given as to conditions for obtaining superior polarization conversion performance of the polarizing element of the present invention.

In general, when a TN liquid crystal layer receives a linearly polarized light having electric field vector parallel with or perpendicular to the molecule axes on the incident side while emitting a linearly polarized light having electric field vector parallel with or perpendicular to the molecule axes on the emitting side, the following relationship exists between the twist angle $\theta$ and the wavelength $\lambda$, as derived from the Gooch-Tarry's formula (C. H. Gooch and H. A. Tarry, "The optical property of twisted nematic liquid crystal structures with twist angles<90°" Appl. Phys., Vol. 8, 1975).

$$\theta[1+\{\pi d\Delta n/(\theta\lambda)\}^2]^{\frac{1}{2}}=2k\pi \quad (k: \text{an integer}) \tag{4}$$

where, $\Delta n$ represents the diffractive index anisotropy of the liquid crystal, while d represents the thickness of the liquid crystal layer.

The following formula (5) can be obtained by transforming the formula (4).

$$\lambda = \Delta nd\,(4k^2-\theta^2/\pi^2)^{-\frac{1}{2}} \tag{5}$$

According to the formula (5), $\theta$ varies in relation to $\lambda$ along a downwardly convexed curve having the minimum value at $\theta=0$.

On the other hand, in the polarizing element of the invention of this application, the twist angle $\theta$ is continuously distributed within the range of $-\pi/2 \leq \theta \leq \pi/2$, so that the wavelength $\lambda$ takes the minimum value $(=\lambda_1)$ at $\theta=0$ and the maximum value $(=\lambda_2)$ at $\theta=\pm\pi/2$. Therefore, when the wavelength of the light source used is $\lambda$, the $\Delta nd$ value of the liquid crystal layer should be determined to meet the condition of $\lambda_1 \leq \lambda \leq \lambda_2$.

When the twist angle $\theta$ is 0, the formula (4) is written as follows:

$$\Delta nd\,(2k)^{-1}=\lambda(=\lambda_1) \quad (k: \text{natural number}) \tag{6}$$

When the twist angle $\theta$ is $\pm\pi/2$, the formula (4) is transformed as follows:

$$\Delta nd\,(4k^2-\tfrac{1}{4})^{-\frac{1}{2}}=\lambda(=\lambda_2) \quad (k: \text{natural number}) \tag{7}$$

It is therefore possible to attain good polarization conversion by satisfying the following condition over the entire region of $-\pi/2 \leq \theta \leq \pi/2$.

$$(4k^2-\tfrac{1}{4})^{\frac{1}{2}} \leq \Delta nd/\lambda \leq 2k \quad (k: \text{natural number}) \tag{8}$$

Figure 8A:
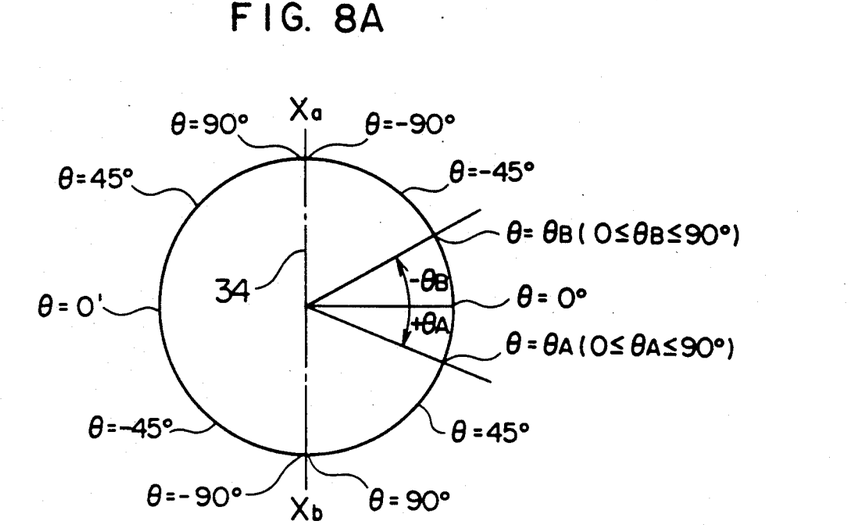
FIGS. 8A and 8B are an illustration of twist angle distribution of the polarizing element of the invention and a plan view of another embodiment of the polarizing element.
Figure 8B:
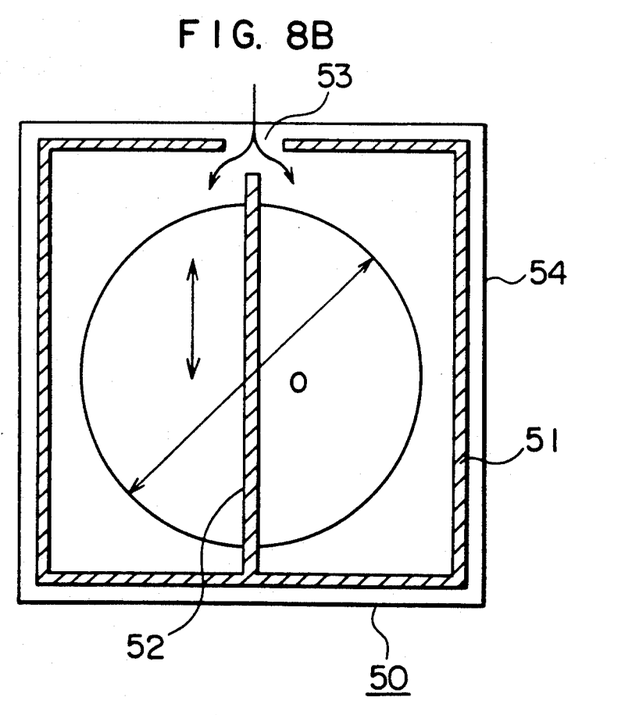

FIGS. 8A and 8B are illustrations of another embodiment of the polarizing element in accordance with the present invention.

More specifically, FIG. 8A shows the distribution of liquid crystal twist angle in the polarizing element of the present invention. As will be seen from this Figure, a region called disclination line, where the TN structures of opposite twist directions (twist angles $\theta$ of 90° and $-90°$) is generated along a line 34 interconnecting points Xa and Xb. In general, a random orientation state is generated in this region, resulting in a random state of polarization of the transmitted light. Furthermore, the disclination line shifts according to a temperature rise and, hence, is unstable. In addition, the disclination line is offset from the direction of linear polarization when the nematic liquid crystal contains a rotary substance, even though the amount of such substance is trace, resulting in an asymmetrical distribution of the twist angle.

In the embodiment shown in FIG. 8b, a split means is provided in the liquid crystal layer so as to prevent degradation of the polarization conversion performance attributable to the disclination. As shown in this Figure, the liquid crystal is sealed in a cell by means of a sealant 51 so as to form a liquid crystal cell 50. In general, the sealant 51 is obtained by forming a thermosetting or ultraviolet setting resin which is applied in a predetermined pattern to the joint surfaces of two transparent substrates with the use of a screen printing process or the like before these substrates are adhered to each other. The seal pattern is formed as a narrow linear pattern 52 parallel to the direction of the linear orientation of the liquid crystal layer and passing through the center of the concentric line. After the application of the sealant, the substrates are adhered to each other and the liquid crystal is charged into the cell through a charging port 53. A photo-setting resin or the like material is applied to the charging port 53 and is then set by application of light. It is therefore possible to simultaneously charge two regions with the liquid crystal, thus splitting the liquid crystal layer into two regions. The split line thus provided in the liquid crystal eliminates disclination so as to stabilize the twist angle distribution, thus offering a high polarization conversion performance of the polarizing element.

As will be realized from the foregoing description, the present invention offers the following advantages.

According to the invention, it is possible to effect a conversion from a concentric-circle polarized light into a linearly polarized light and vice versa, by using a single layer of TN liquid crystal, so that the construction of the element is remarkably simplified. In addition, the element can be produced easily since the liquid crystal orientation is tangential (rotational) at one side of the element and linear at the other side.

In addition, by providing dividing means which divides the liquid crystal layer of the polarizing element into two or more regions, it is possible to eliminate the disclination region so as to stabilize the twist angles at predetermined positions. Furthermore, the retardation of the liquid crystal is optimized to allow an almost perfect conversion between the concentric-circle polarization and linear polarization.

Furthermore, in one form of the optical head device of the present invention incorporating a concentric circle grating coupler, a polarized element or a combination of a polarizing element and a phase compensation means is disposed between the point of convergence of light and the grating coupler so that a radiation light from the grating coupler can be converted into a linearly polarized light so as to achieve a high convergence characteristic.

When the polarizing element of the invention or a combination of the polarizing element and the phase conversion means is provided between the laser light source and the input grating coupler, the input coupling efficiency to the waveguide layer can be increased.

Thus, the present invention provides a polarizing element having superior polarization conversion performance, and an optical head device incorporating this element and exhibiting a superior light converging performance and high rate of utilization of light.

What is claimed is:

1. A polarizing element comprising a twist nematic liquid crystal layer, wherein one of the liquid crystal orientation surfaces of said liquid crystal layer has a linear orientation while the other liquid crystal orientation surface has an orientation tangential to concentric circles.

2. A polarizing element according to claim 1, further comprising dividing means for dividing said liquid crystal layer into two regions by a border which extends substantially in parallel with the direction of the linear orientation and which passes the center of the concentric circles.

3. A polarizing element according to claim 2, wherein said liquid crystal layer is formed in a region defined by a pair of opposing transparent substrates and a sealant arranged between said substrates at the peripheral portions of said substrates, and said dividing means is formed by a linear sealant.

4. A polarizing element according to claim 1, wherein the refractive index anisotropy $\Delta n$ of said twist nematic liquid crystal layer, the thickness d of said liquid crystal layer and the wavelength $\lambda$ of the light meet the following condition:

$$(4k^2-1)^{\frac{1}{2}} \leq \Delta nd/\lambda \leq 2k \quad (k: \text{natural number})$$

5. A liquid crystal element according to claim 4, further comprising a phase compensation means which produces a phase difference by an amount $\pi$ between lights propagating through two spatial regions which are divided by a straight line passing through the center of the concentric circles and substantially parallel to the direction of linear orientation of said twist nematic liquid crystal layer.

6. A polarizing element according to claim 5, wherein said phase compensation means includes a transparent plate disposed in one of said spatial regions and meeting the following condition:

$$(n-1)t + (2k-1)\lambda/2 \quad (k: \text{natural number})$$

where, $\lambda$ represents the wavelength of the light, n represents the refractive index of said transparent plate and t represents the thickness of said transparent plate.

7. A liquid crystal element according to claim 1, further comprising a phase compensation means which produces a phase difference by an amount $\pi$ between lights propagating through two spatial regions which are divided by a straight line passing through the center of the concentric circles and substantially parallel to the direction of linear orientation of said twist nematic liquid crystal layer.

8. A polarizing element according to claim 7, wherein said phase compensation means includes a transparent plate disposed in one of said spatial regions and meeting the following condition:

$$(n-1)t = (2k-1)\lambda/2 \quad (k: \text{natural number})$$

where, $\lambda$ represents the wavelength of the light, n represents the refractive index of said transparent plate and t represents the thickness of said transparent plate.

9. An optical head device comprising: a laser light source; coupling means through which a laser light from said laser light source is input to a waveguide layer so as to become a wave-guided light; a waveguide path for guiding said wave-guided light radially within said waveguide layer from a point in said waveguide layer; a concentric periodic structure provided in said waveguide path around said point; a transparent layer disposed adjacent said waveguide layer and having a refractive index smaller than that of said waveguide layer;

a first polarizing element disposed between said laser source and said coupling means; and a second polarizing element disposed between said periodic structure and a point of convergence of light; wherein each of said first and second polarizing elements has a twist nematic liquid crystal layer with one liquid crystal orientation layer having a linear orientation and the other liquid crystal orientation layer having an orientation tangential to concentric circles, said transparent layer is divided into two regions by a straight line passing through the center of said concentric circles and substantially parallel to the direction of linear orientation of said polarizing element, and the length of contact between said waveguide layer and the transparent layer adjacent thereto in the direction of radius from said point in said waveguide layer in one of said regions is different from that in the other of said regions.

10. An optical head device according to claim 9, wherein said first polarizing element is arranged such that the linearly oriented surface thereof faces said laser light source, while said second polarizing element is arranged such that its linearly oriented surface faces said point of convergence of light.

11. An optical head device according to claim 9, further comprising a phase compensation means disposed between said first polarizing element and said laser light source or between said second polarizing element and said point of convergence of light at a position corresponding to one of said two regions, said phase compensation means being capable of creating a phase difference of light in an amount $\pi$.

12. An optical head device according to claim 11, wherein said phase compensation means includes a transparent plate disposed in one of said spatial regions and meeting the following condition;

$(n-1)t = (2k-1)\lambda/2$ ($k$: natural number)

where, $\lambda$ represents the wavelength of the light, n represents the refractive index of said transparent plate of said phase compensation means and t represents the thickness of said transparent plate.

13. An optical head device comprising: a laser light source; coupling means through which a laser light from said laser light source is input to a waveguide layer so as to become a wave-guided light; a waveguide path for guiding said wave-guided light radially within said waveguide layer from a point in said waveguide layer; a concentric periodic structure provided in said waveguide path around said point; a first polarizing element disposed between said laser source and said coupling means; and a second polarizing element disposed between said periodic structure and a point of convergence of light; wherein each of said first and second polarizing elements includes a twist nematic liquid crystal layer having one liquid crystal orientation surface having a linear orientation and the other liquid crystal orientation surface having an orientation tangential to concentric circles, said first and second polarizing elements being arranged such that the directions of linear orientation of said polarizing elements are substantially parallel with each other and substantially parallel with or perpendicular to the electric vibration plane of said laser light.

14. An optical head device according to claim 13, wherein said first polarizing element is arranged such that the linearly oriented surface thereof faces said laser light source, while said second polarizing element is arranged such that its linearly oriented surface faces said point of convergence of light.

15. An optical head device according to claim 13, further comprising a first phase compensation means disposed between said first polarizing element and said laser light source in one of two spatial regions divided by a straight line passing through the center of said concentric circle and substantially parallel with the direction of linear orientation of said twist nematic liquid crystal layer, and a second phase compensation means provided between said second polarizing element and said point of convergence of light in the other of said two spatial regions.

16. An optical head device according to claim 15, wherein each of said phase compensation means includes a transparent plate disposed in one of said spatial regions and meeting the following condition:

$(n-1)t = (2k-1)\lambda/2$ ($k$: natural number)

where, $\lambda$ represents the wavelength of the light, n represents the refractive index of said transparent plate and t represents the thickness of said transparent plate.

* * * * *